Jan. 16, 1934.  C. D. CUTTING  1,943,814
UNIVERSAL JOINT
Filed Aug. 9, 1933

INVENTOR
Charles D. Cutting
BY
ATTORNEYS

Patented Jan. 16, 1934

1,943,814

UNITED STATES PATENT OFFICE 1,943,814

UNIVERSAL JOINT

Charles D. Cutting, Detroit, Mich., assignor to Charles D. Cutting, Inc., Detroit, Mich., a corporation of Michigan Application August 9, 1933. Serial No. 684,352

15 Claims. (Cl. 64—102)

This invention relates to universal joints and has for its object to provide a joint of such construction as will better withstand the demands of present day power units.

A universal joint may be described as two or more yoke members and one or more members comprising trunnions journalled in the yoke members. Upon the application of torque or when unit pressure is applied, the trunnions theoretically move to a position exactly parallel with and hence in surface contact with a substantial portion of the bearings whereupon continued application of torque produces movement of yokes by the trunnions or vice versa. However this desired condition of parallelism is upset first by necessary clearance between a bushing and its trunnion and second by distortion of the yoke structure caused by excessive torque when a shock load is applied with the result that the surface contact becomes substantially point contacts at the inner and outer edge of the bearing, and galling or brinnelling results. Under severe maintained trunnion pressure it has been found that clearance even as small as one-thousandth of an inch is fatal to the bearing after very short service especially with plain bearing construction. And even though it were possible in production to turn out an absolutely perfect fit of the trunnions in the bushings, clearance is caused by wear. It is therefore an object of this invention to provide a trunnion, yoke and bearing assembly in which a full length of bearing contact may be maintained regardless of clearance between trunnion and bearing.

Another object is to introduce a possible universal movement of the trunnion with respect to its yoke in order to absorb the vibrations caused by inherent unbalance. Such flexible insulation existing between trunnion and yoke prevents, also, the passing of vibrations from the motor and transmission into rear axle and vice versa.

It is therefore a specific object of the invention to incorporate a rubber cushioning element in a universal joint to function with the usual metallic trunnions, yokes and bearings in such manner that the rotational and spline pressure of each trunnion will be transmitted over a substantial portion of the yoke, this rubber also inherently providing a universal motion for the trunnion in the yoke.

It will be well understood by those skilled in the art that the construction as herein revealed will materially reduce costs of manufacturing because of making is possible to work to greater tolerances thereby accomplishing another object of this invention.

While the rubber, as just described will provide a universal movement for each trunnion in its yoke and resiliency in the direction of thrust, it is highly essential to the functioning of any joint that free movement of the trunnions in thrust (axially) during operation be definitely avoided. There are several matters of importance when considering thrust. First, since endwise play is caused by wear it is an object of this invention to provide yieldable means between each yoke and its trunnion operative against a point contact as a means for eliminating free endwise movement during the life of the joint. Since all clearances are thereby eliminated and since the universal movement of each trunnion in its yoke has been provided it is a further object to provide a suitable additional means for association with the endwise thrust bearing which will accommodate the universal movement of the trunnion in its yoke by providing both for a universal and a lateral sliding or rolling movement.

A further object is to incorporate manual adjusting means for bodily shifting the trunnion members along either axis, this means being so constructed as to permit the free universal movement of each trunnion in its yoke as above described. It is well known in the art today that the balancing of a propeller shaft is accomplished by kinking the propeller tube at one or more points in its length, in other words, off-setting the static run out of the tube.

The stretching of the thin wall thickness on one side of the tube and the shrinking or compressing of the material on the other side sets up strains in the metal which when rotating at high speed and due to vibration tends to remove the kink and thereby bring the shaft back to its original condition of unbalance. Therefore a further object is to incorporate manual adjusting means for bodily shifting the trunnion members and by off-setting the unbalanced yokes obtain a perfectly balanced propeller shaft.

A still further object is to provide an endwise thrust bearing which combines automatic slack take up means with a point support for proper cooperation with the assembly above described.

A further object is to provide a cushioning means in the universal joint as described which will damp vibrations and substantially insulate the opposed yoke members.

Another object is to provide a universal joint, as described, which will include a lubricating chamber from which lubricant cannot be lost during operation.

While there are several salient features herein related, all of which combine to produce the desired results, it should be made clear that it is possible to separate the features and still obtain proportionately improved results over prior art in a fully operative structure. The features above mentioned together with an understanding of the relative merits of the various features will become hereinafter more fully apparent as reference is had to the accompanying drawing wherein my invention is illustrated by way of example, in several practical forms, and in which—

More particularly, 1 and 2 refer to yoke members, one of which is splined, and 3 denotes a Cardan cross. While a particular type of yoke and cross is illustrated, the invention is adaptable for use with all other universal joints in which axially alined bearing members are found normal to other axially alined bearing members, as for instance in the so-called ring type joints. The yoke members each have yoke arms 4 in which the outer ends of the cross are journalled as trunnions. Each yoke arm assembly is identical with the others.

Figure 1:
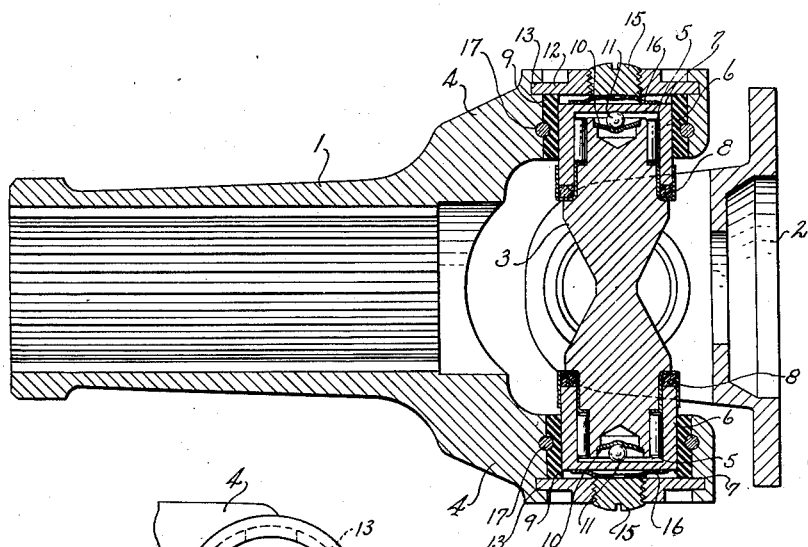
Figure 1 is a vertical section taken axially of yoke members in which a cross is mounted in accord with the present invention.

In Figure 1 the end of each arm of the Cardan cross has a bearing surface for engagement with a bearing 5 which, in turn, engages the inner surface of a bushing 6, closed at its outer end 7 and extending well inwardly of the bearing for residence in a suitable packing 8. Between the bushing 6 and the yoke arm 4 is a resilient means, here illustrated, as a ring of rubber 9 which insulates the yoke arm 4 and the bushing 6 as to vibrations of high frequency including those in the audible range, and which permits of relative axial movement of the trunnions and their yoke arms both laterally and universally.

Between the end of the trunnion and the cap 7 of the bushing 6 is interposed a device capable of eliminating free endwise movement of the trunnions in their yokes. As will be hereinafter referred to again this device will be so constructed as to take up slack but in so doing to maintain a substantially rigid assembly as to endwise movement for even a slight actual resiliency will prove fatal. In order to describe this device it is therefore necessary to clearly distinguish between the word "resilient" which means "springy" and the word "yieldable" which we may define as meaning "movable without any intimation of a return movement" such as a spring would entail. This means is preferably made of a disc 10 of spring steel having a slight depression centrally thereof to receive a ball 11. The disc is simply a flat, sturdy stamping (except for the little depression) which is dished under heavy pressure in assembly and which thereupon urges the ball against the cap 7. The ball provides substantially a point contact with the cap and is hence highly satisfactory at this point. The cup shaped bushing forms an excellent means to prevent loss of lubricant from the bearing 5 so that a small joint so constructed will ordinarily never need to be taken down in service for purposes of adding grease.

Figure 2:
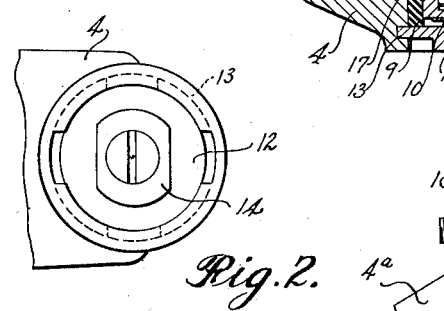
Fig. 2 is an endwise plan view of a yoke arm having a trunnion assembled therein.
Figure 3:
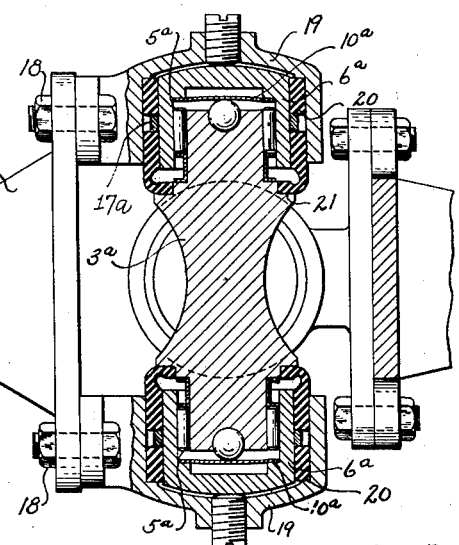
Fig. 3 is a section taken transversely of the cross member and longitudinally of the yoke members illustrating a modified form of the invention.

A lipped disc 12 finds a bayonet lock with the groove 13 in the yoke arm 4 thus sealing the bushing 6 therein. As seen in Figure 2 this disc is provided with a top 14 adaptable for rotation and consequent removal with the aid of a wrench. Centrally through this top 14 a screw 15 is inserted and a second rigid or substantially rigid disc 16 resides between this screw and the top of the bushing 6. This disc 16 is not intended to be and will not be resilient since its function is that of a swivel for the bushing 6 which also allows lateral movement of the bushing with respect to the yoke arm. Each screw 15 has a spherical surface at its inner end, the sphere having its center on the transverse axis of the cross 3, and the member 16 is formed for seating in this spherical cup. Opposite screws 15 may be manipulated for shifting the cross bodily along either of its axis for the purpose of obtaining dynamic balance of the entire rotating assembly including the shafts (not shown) which engage the yoke members 1 and 2.

Upon assembly and in adjusting for dynamic balance also, a sufficient pressure may be manually exerted in rotating the screws 15 to depress the discs 10 and as wear occurs these discs 10 will tend to assume their original shape. However, the pressure which may thus be exerted thereagainst is much greater than the endwise thrust of the trunnions in operation it is readily seen that the slack take up device may be accurately described as yieldable against manual adjustment and yieldable to the extent of eliminating slack but rigid against free endwise movement of the trunnions with respect to the yoke arms commercially, this is highly important.

No movement of the bushing 6 with respect to the rubber 9 is contemplated or desired. The bushing and the rubber may be vulcanized together, or, preferably, the rubber may be slightly longer than the opening provided therefor so that the disc 12 upon assembly in its groove must exert pressure thereon. This permanent pressure serves as an additional locking means for the disc 12 also. A snap ring 17, preferably of metal serves the double function of a retainer for the rubber in the yoke arm and of a stop for limiting the possible movement of the trunnion with respect to the yoke.

In Figure 2 the yoke arms are made demountable by the use of bolts 18. By this arrangement, machining of grooves for endwise lock discs is eliminated in favor of an integral cup-like arm 19. This cup has a spherical interior surface, as has also the bushing 6a, the sphere having its center at the axis of rotation of the cross 3a. A rubber ring 20, which performs the functions described in connection with the ring 9, resides between the bushing and the yoke arm 19. This ring 20 is extended inwardly to form a packing against the entry of dust, fitting tightly about the trunnions at 21 as illustrated.

Figure 4:
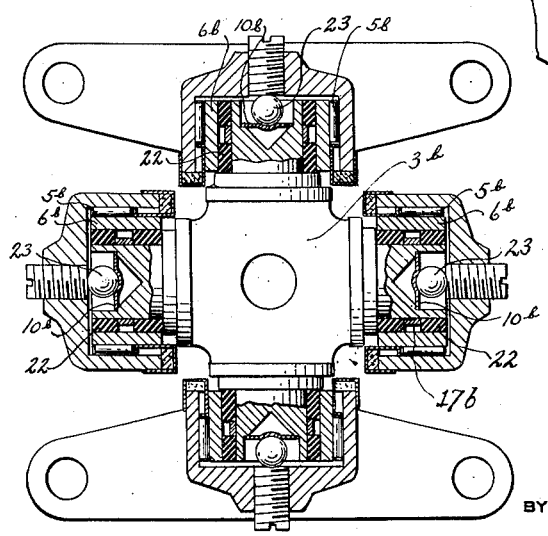
Fig. 4 is a section taken transversely of the yoke members, showing the cross partially in elevation, and illustrating another modification of the invention.

In Figure 4 the trunnions 3 are immediately surrounded by a rubber ring 22 and the bushing 6b is outwardly thereof. The bearings 5b are therefore between the bushing and the yoke arm.

This bushing 6b is open at its outer end so that the disc pressed ball 23 is given the double function of serving with the slack eliminating disc 10b and also of providing for endwise universal motion between the trunnion and the yoke arm. The ball 23 may slide along the end of the adjustment screw 15 also when so required.

The foregoing illustrates to some extent that my invention is capable of substantial modification without departing from the spirit thereof and I therefore desire to be limited in protection only as defined by the scope of the appended claims.

What I claim is:—

1. A universal joint comprising pairs of trunnions, a journal member for each of said trunnions, a freely rotatable bearing between each journal member and its trunnion, and universal means concentric with and individual to each of, said bearings to allow an amount of freedom of the axis of each of said trunnions with respect to its journal member, said universal means being also inherently resilient to provide cushioning of said trunnions in said journal member upon application of thrust.

2. A universal joint comprising pairs of trunnions, a journal member for each of said trunnions, a freely rotatable bearing between each journal member and its trunnion, universal means associated with said bearing to allow an amount of freedom to the axis of said trunnion with respect to said journal member, said universal means being resilient in the direction of rotational thrust as a cushioning means for the trunnion in the journal member, said universal means being also resilient in the direction of axial thrust, and rigid metallic means for transmitting the rotational thrust imparted to each of said universal means to the adjacent universal means.

3. A universal joint comprising pairs of trunnions, a journal member for each of said trunnions, a bushing between each of said trunnions and its journal member, resilient means associated with each bushing for cushioning the movement of each trunnion in its journal member, and a stop for definitely limiting the amount of loading which may be imposed on said resilient means.

4. A universal joint comprising pairs of trunnions, a journal member for each of said trunnions, a free bearing between each of said trunnions and its journal member, and a rubber ring of substantially uniform wall thickness associated with and individual to each of said bearings and encircling each of said trunnions for cushioning the rotative and spline thrust of each trunnion with respect to its yoke.

5. A universal joint comprising pairs of trunnions, a journal member for each of said trunnions, a free bearing between each of said trunnions and its journal member, and a rubber ring associated with each of said bearings and encircling each of said trunnions for cushioning the rotative movement of each trunnion with respect to its journal member, said rubber ring being installed under initial compression, and a stop for limiting the degree of additional compression to which each of said rubber rings may be subjected during operation.

6. A universal joint comprising pairs of trunnions, a journal member for each of said trunnions, a free bearing between each of said trunnions and its journal member, resilient universal means associated with said bearing constituting a self-alining means for the working surfaces of said bearing, said journal members each having a cap thereon forming a cover over the outer ends of said trunnions, and a universal thrust bearing between each of said caps and the end of its trunnion yieldable in the direction of thrust for accommodating the universal movement of said trunnion.

7. A universal joint comprising pairs of trunnions, a journal member for each of said trunnions, a free bearing between each of said trunnions and its journal member, universal means associated with said bearing constituting a self-alining means for the working surfaces of said bearing, said journal members each having a cap thereon forming a cover over the outer ends of said trunnions, and a combination swivel and slide bearing yieldable in the direction of thrust between each of said caps and the ends of its trunnion for accommodating the universal movement of said trunnion in rotational and spline thrust.

8. A universal joint comprising pairs of trunnions, a journal member for each of said trunnions, a free bearing between each of said trunnions and its journal member, universal means associated with each of said bearings constituting a resilient self-alining means for the working surfaces of said bearings, said journal members each having a cap thereon forming a cover over the outer ends of said trunnions, and a thrust bearing between each cap and the end of its trunnion, a slack take up means associated with said thrust bearing, and means associated with said thrust bearing incorporating a spherical surface against which said slack take up means acts by which the universal motion of said trunnion in rotational thrust is accommodated to said thrust bearing and to said slack take up means.

9. A universal joint comprising pairs of trunnions, a journal member for each of said trunnions, a bearing between each of said trunnions and its journal member, elastic universal means associated with each of said bearings providing relative lateral movement of the axis of said trunnion with respect to its journal member, each of said journal members being closed over the end of its trunnion, spacer means comprising a stiff pressure deformed steel disc and a member having a spherical surface against which said disc acts to form a thrust bearing capable of accommodating the universal movement of said trunnion with respect to its yoke.

10. A universal joint comprising pairs of trunnions, a journal member for each of said trunnions, said trunnions each being cushioned for rotational thrust with respect to said journal member, a yieldably supported thrust bearing between the end of each trunnion and its yoke, manually adjustable means for shifting said trunnions axially with respect to said journal member, said adjustable means being also employed for preloading the thrust bearing support, said support being yieldable under substantial pressure exerted on said manual means and sufficiently stiff to constitute a substantially rigid member in normal operation.

11. A universal joint comprising two yokes, a cross member having trunnions journalled in said yokes for rotational and cushioned universal movement, an endwise thrust bearing between each of said trunnions and its yoke, a spherical surface associated with the outer end of each of said trunnions, a manually operable screw in each yoke outwardly of the end of each of said trunnions by which said cross member may be shifted bodily along either of its axes for adjustment with respect to either of said yokes, said screw having a flat surface for swiveling and sliding of said spherical surface therein to accommodate the universal movement of said trunnion.

12. In combination in a universal joint, pairs of trunnions, a journal member for each of said trunnions, a rubber cushioning element between each of said trunnions and said journal member, and an endwise thrust bearing between each of said trunnions and its yoke, said thrust bearing comprising a pressure deformed steel spring disc of sufficient stiffness to prevent in and out movement of any trunnion in its yoke during operation of the universal joint in service and a hardened steel ball point against which said disc acts in maintaining the end of said trunnion spaced from its journal member.

13. In a universal joint wherein pairs of trunnions are arranged in regular alternation, housing means for receiving the trunnions to permit universal action of the joint, a journal for each trunnion, an elastic member for and individual to each journal, said housing means being operative to retain the elastic members in definite relation to the journal to thereby permit free relative movement of the journal and its trunnion rotatively and to retain normal bearing relation between journal and trunnion.

14. In a universal joint, the combination of a driving member and a driven member, and an elastic element between said members, said element being freely rotatable with respect to at least one of said members and a stop for limiting the degree of distortion which may be imparted to said element upon rotational thrust of one of said members with respect to the other.

15. A universal joint comprising pairs of trunnions, a journal member for each of said trunnions, a free bearing between each of said trunnions and its journal member for free rotation of said trunnion therein, and a rubber ring of substantially uniform thickness associated with and individual to each of said bearings encircling each of said trunnions for cushioning the rotative movement of each trunnion with respect to its journal member by compression, said rubber ring being installed under initial compression, and a stop for limiting the degree of additional compression to which each of said rubber rings may be subjected during operation.

CHARLES D. CUTTING.